UNITED STATES PATENT OFFICE.

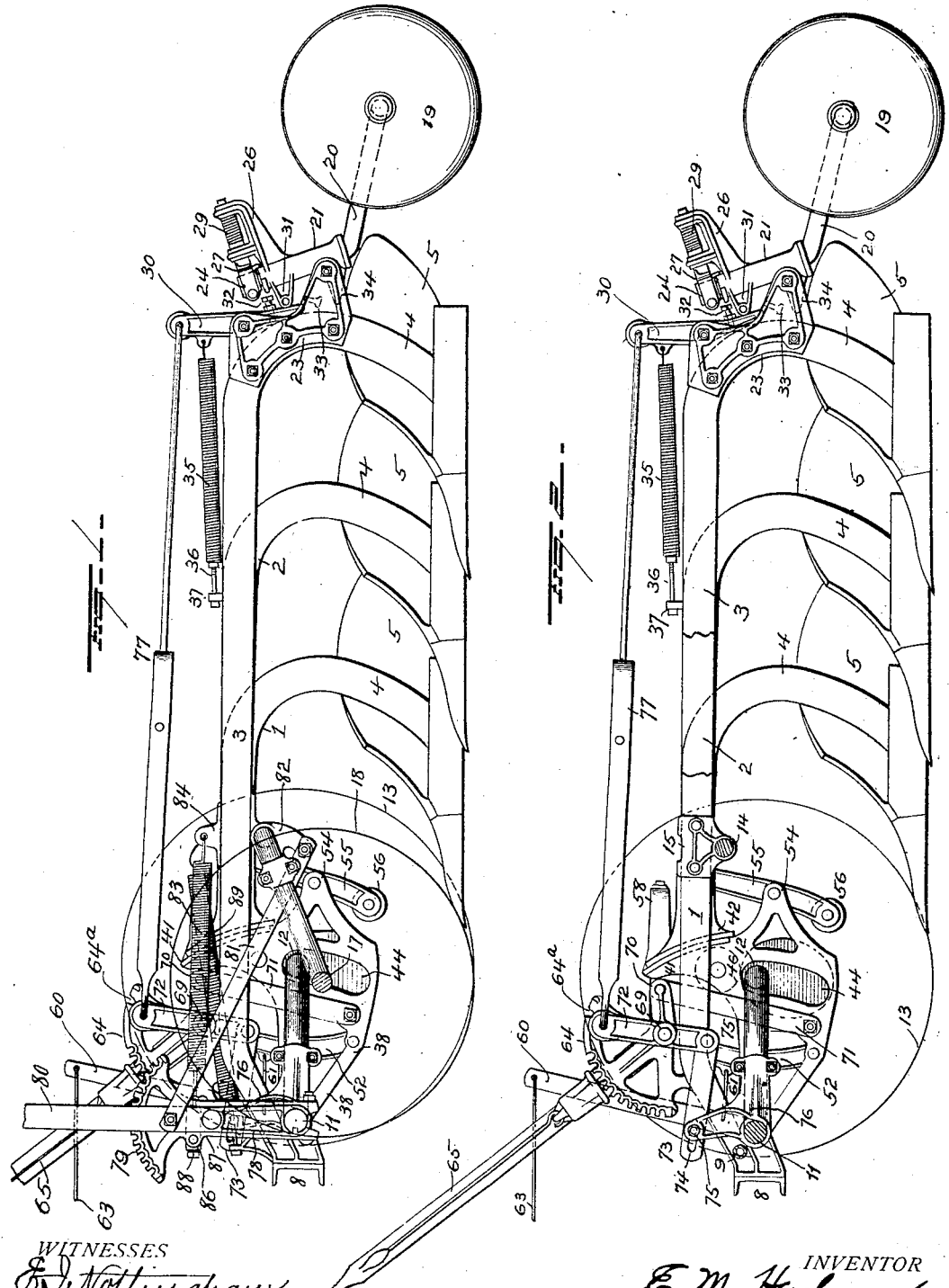

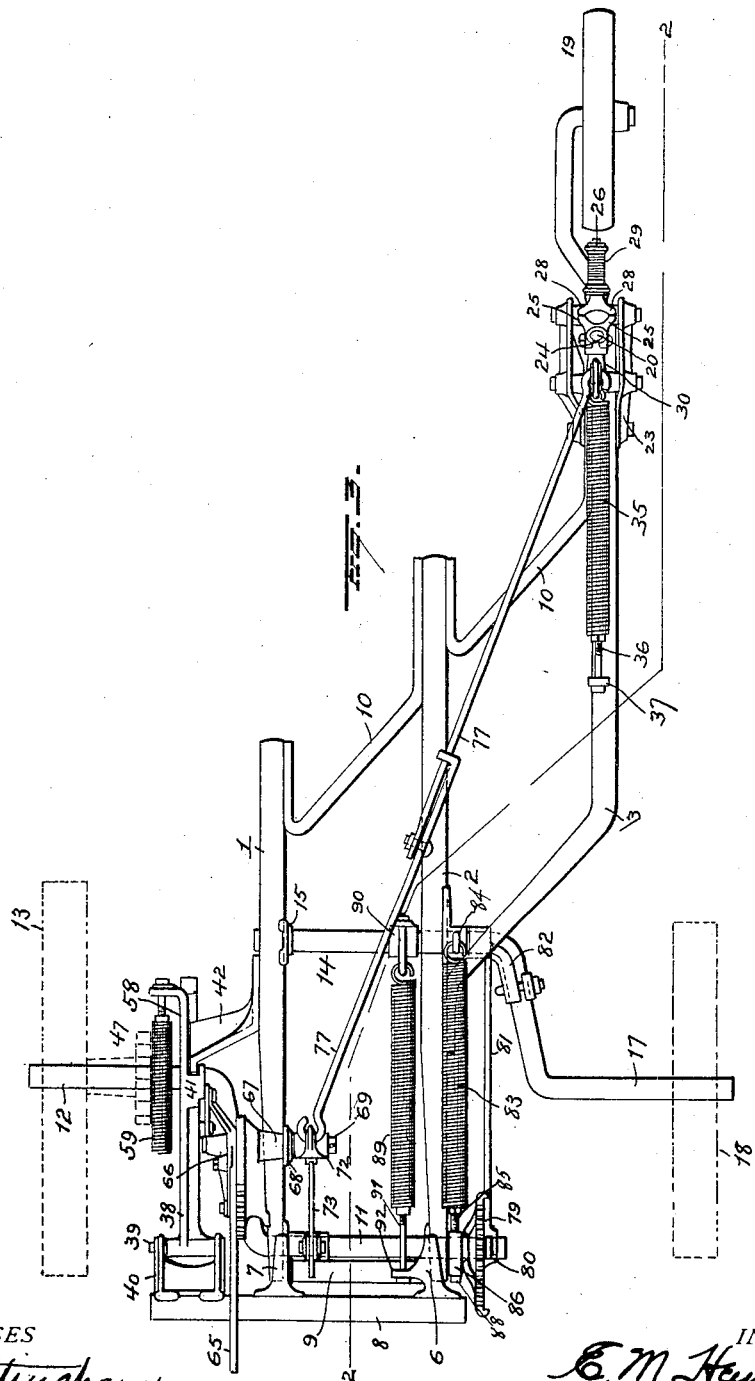

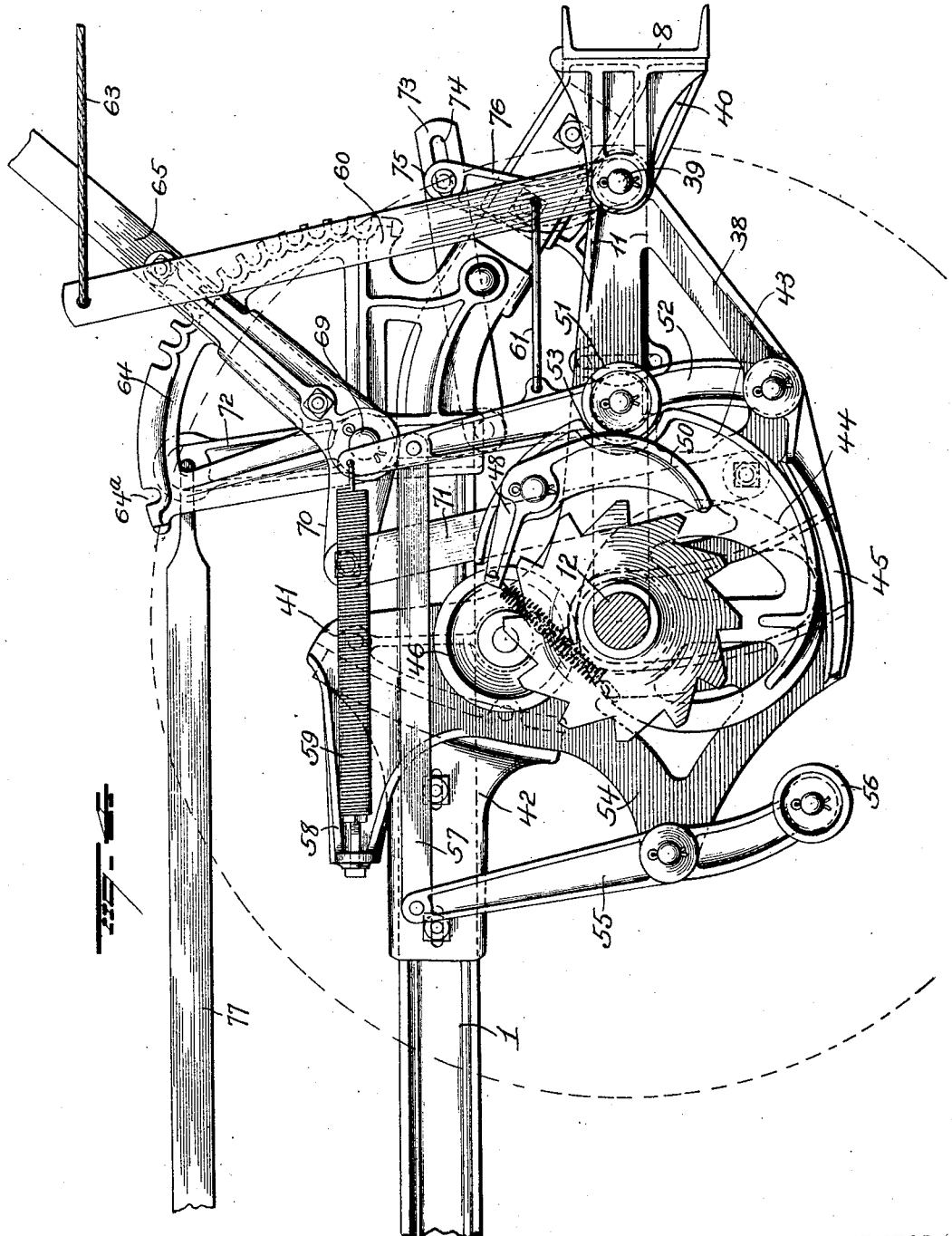

EDWARD M. HEYLMAN, OF SOUTH BEND, INDIANA, ASSIGNOR TO OLIVER CHILLED PLOW WORKS, OF SOUTH BEND, INDIANA.

ENGINE GANG-PLOW.

1,234,761.      Specification of Letters Patent.      Patented July 31, 1917.

Application filed October 21, 1915. Serial No. 57,115.

*To all whom it may concern:*

Be it known that I, EDWARD M. HEYLMAN, a citizen of the United States, and a resident of South Bend, in the county of Saint Joseph and State of Indiana, have invented certain new and useful Improvements in Engine Gang-Plows; and I do hereby declare the following to be a full, clear, and exact description of the invention, such as will enable others skilled in the art to which it appertains to make and use the same.

This invention relates to improvements in engine gang plows such as employ power lift mechanism, the present invention having special reference to means for adjusting the plow gang.

One object of my present invention is to provide simple and efficient means coöperative with parts of the power lift mechanism for adjusting the plow gang for depth of plowing.

A further object is to provide, in a gang plow of the type specified, simple and efficient means for leveling the plow gang.

A further object is to so construct adjusting mechanism that, with the use of hand levers, the raising or lowering and leveling of the plow gang for regulating the depth of plowing and for leveling the plows, may be easily accomplished with the expenditure of a minimum amount of exertion.

With these and other objects in view, the invention consists in certain novel features of construction and combinations of parts as hereinafter set forth and pointed out in the claims.

In the accompanying drawings; Figure 1 is a side elevation, partly in section, of a gang plow embodying my improvements; Fig. 2 is a sectional view on the line 2—2 of Fig. 3; Fig. 3 is a plan view, and Fig. 4 is an enlarged view illustrating the power lift and adjusting mechanism associated therewith.

1, 2, 3 represent the beams of the several plows of the gang and said beams are provided with depending standards 4 to which plow bottoms or bases 5 are secured. The plows are arranged in staggered formation as usual with gang plows and the forward ends of the beams 1 and 2 are connected, through the medium of coupling devices 6—7 with a draft beam 8, while the forward end of the beam 3 may be bent laterally and secured to the beam 2. The coupling devices 6—7 are connected by a transverse brace 9, and the rear portions of the beams are connected and properly spaced apart by means of braces 10. The beam brackets or couplings 6—7 afford bearings for a furrow wheel crank axle 11, the cranked portion of which extends downward and rearwardly at one end and provided with a laterally projecting spindle portion 12 mounted in the hub of a furrow wheel 13.

A rear crank axle 14 is mounted in suitable bearing brackets 15—16; the crank arm of this axle projecting downwardly and forwardly from one end thereof and provided with a lateral spindle portion 17 mounted in the hub of the landside wheel 18.

The rear end of the gang of plows is supported by a caster or follower wheel 19. The upright portion of the axle 20 for this wheel is mounted in and projects upwardly beyond a bearing sleeve 21 pivotally supported at 22 between the rearwardly projecting lower portions of two plate brackets 23,—the latter being bolted at respective sides of the standard portion of the rearmost plow beam 3. A head 24 is secured to the upper end of the upright axle 20 and provided with radial projections 25. A bracket arm 26 projects rearwardly from the upper end of the bearing sleeve and affords a mounting for a plunger 27 having radial projections 28 at its forward end bearing against the radial projections 25 at the upper end of the axle 20,— rearward movement of said plunger being resisted by means of a spring 29. This construction provides a yieldable holding or locking means for the caster or follower wheel axle and serves to insure the retention of said wheel in proper alinement with the plow gang during the normal operation of the same, but at the same time permitting the wheel to caster when the plow is turned or to yield when subjected to abnormal lateral resistance.

A lever 30 is pivoted intermediate of its ends between the upper ends of the plate brackets 23 and the lower arm of this lever is disposed between the standard portion of the beam 3 and an arm 31 projecting forwardly from the upper portion of the bearing sleeve 21 so as to be in position to engage said arm. When the lever 30 is operated (by means hereinafter described) so as to move its upper end forwardly, its lower arm, (engaging the arm 31) will turn the bearing sleeve 21 on its pivotal support and thus cause the same to approach a vertical position and tends to press the follower wheel downwardly to raise the rear portion of the plow structure.

For the purpose of adjusting the normal working position of the follower wheel and thus adjust the working depth of the rear ends of the plow bases, I provide a set screw 32 passing through the lower arm of the lever 30 and engaging the standard portion of the beam 3. In order to limit the rearward movement of the bearing sleeve 21 and the consequent downward movement of the follower wheel 19 during the raising of the rear end of the flow structure, a stop 33 is provided on one of the bracket plates 23 in position to be engaged by an arm 34 projecting forwardly from the pivoted lower end of the bearing sleeve.

A spring 35 is connected at one end to the upper arm of the lever 30 and at the other end, said spring is connected, by means of an adjustable rod 36, with a bracket 37 secured to the beam 3,—the purpose of which spring will be hereinafter explained.

A vertically disposed frame 38 is pivotally mounted at its forward end on a shaft 39 supported by a bracket 40 secured to the draft channel 8 at the furrow side of the plow structure and near the beam 1. The frame 38 is made with an upwardly-projecting portion 41 having sliding engagement with a guide bracket 42 secured to the beam,—the engaging faces of said frame and bracket being curved concentrically to the pivotal support of the frame 38 and at an angle to a vertical line passing through frame, bracket and beam so that when said frame is raised without pivoting engagement of the frame with the bracket will cause the beams to rise.

A plate 43 is mounted on the spindle portion 12 of the furrow-wheel axle 11 and carries a cam 44 which lies parallel with the pivoted frame 38 and is disposed over a flange 45 at the lower edge of said frame. A roller 46 is mounted on the pivoted frame 38 over the cam 44, so that the cam is disposed between said roller and the flange 45 of the pivoted frame. The hub of the furrow wheel 13 carries a ratchet wheel 47 and a pawl 48 mounted on the cam plate 43 is adapted to be moved into engagement with said ratchet wheel by the action of a spring 49. The pawl 48 is made with a depending tail portion 50 to be engaged by a roller 51 on a lever 52 for the purpose of normally retaining the pawl out of engagement with the ratchet wheel. The lever 52 is pivotally attached at its lower end to the pivoted frame 38 and the edge of the cam plate 43 is notched as at 53 to permit the roller 51 to engage the tail of the pawl, as clearly shown in Fig. 4. The pivoted frame 38 is made with a rearwardly projecting arm 54 to which a lever 55 is pivotally attached between its ends. The lower end of this lever carries a roller 56 to engage the tail of the pawl 48 when the cam plate and cam shall have been turned sufficiently to raise the plows and thus disengage said plate and cam from the ratchet wheel of the power lift mechanism. The levers 52 and 55 are connected by means of a rod or bar 57 and the pivoted frame is provided at its upper end with a forwardly projecting arm 58, to which one end of a spring 59 is anchored,—the other end of said spring being attached to the lever 52 and serving to normally force the levers 52 and 55 in directions to cause their rollers to engage the tail of the pawl 48, when said pawl is in one or the other of the two positions which it may assume; as when the plows are at work, or when they shall have been raised. A lever 60 is mounted at its lower end on the short shaft 39 with which the pivoted frame is connected, and projects a considerable distance above the same. This lever is connected, by means of a rod 61, with the lever 52 and to the upper end of said lever 60, a cord 63 is attached. This cord extends to the operator's seat on a tractor (not shown) so that by pulling said cord, motion will be imparted to the lever 60 and thence, by the rod 61 to the connected levers 52—55 for the purpose of so operating the latter as to move one or the other of the rollers 51—56 away from the tail of the pawl, to permit the latter to engage the ratchet wheel.

When the parts shall be thus operated, the cam plate and cam will become locked to the furrow wheel by means of the pawl 48 and ratchet 47 and the plows will be raised, as fully described in application for patent filed by me on even date herewith.

A segment frame 64 is secured to the forward portion of the beam 1 and provided with a plurality of notches to receive a suitable detent carried by a hand lever 65. The segment frame is made with laterally projecting hubs 66—67 (Fig. 3) and the latter is connected with the beam 1 by means of a suitable bracket 68. A shaft 69 passes through the hubs 66—67, and on one end portion of this shaft, the lever 65 is mounted. The lever 65 is provided with an arm 70 which projects rearwardly and laterally from the pivotal mounting of the lever and to the free end of this lever arm, the upper end of a rod 71 is pivotally attached,—the lower end of said rod being connected with the lower portion of the pivoted frame 38.

The inner end of the shaft 69 projects beyond its bearing in the hub 67 and upon this projecting end of the shaft 69, a lever 72 is mounted between its ends. To the shorter lower arm of the lever 72, one end of a link 73 is pivotally connected. This link projects forwardly from its connection with the lever 72 and is provided near its forward end with an elongated slot 74 for the reception of a pin 75 at the upper end of an arm or bracket 76 rigidly secured to the furrow wheel crank axle 11.

A rod or pitman 77 (preferably comprising two members secured together) is connected at one end with the upper arm of the lever 72 and at the other end to the upper arm of the lever 30 of the follower wheel adjusting mechanism.

The arm 78 of a notched segment 79 is rigidly secured at its lower end to the furrow-wheel crank-axle 11 and to said segment arm, one end of a hand lever 80 is pivotally attached,—said hand lever being provided with a suitable detent to engage the notched segment. A rod 81 (Fig. 1) is connected at its forward end to the hand lever 80 a comparatively short distance above the pivotal support of the latter and at its rear end this rod is pivotally attached to a bracket-arm 82 secured to the crank axle 14 and depending below the horizontal portion thereof.

A spring 83 for counterbalancing the furrow wheel axle, is attached at one end to a lug 84 and the other end of this spring is connected with the segment 79 or its arm 78 by means of a rod 85 passing through a sleeve 86 pivoted to the segment arm at 87 and having a nut or head 88 at its free end.

A counterbalancing spring 89 for the land wheel axle 14 is attached at one end to an arm 90 on said axle and the other end of this spring is connected, by means of an adjustable rod 91 with a lug 92 on the beam bracket or coupling 6.

Assuming that it is desired to adjust the plow gang to increase the depth of plowing,—the operator will, (from his seat on the tractor) move the lever 65 forwardly and downwardly, thus raising the arm 70 of said lever and transmitting motion, through the rod or link 71, to the pivoted frame 38 to raise the latter. It will be remembered that the cam 44 on the axle 12 is disposed between the flange 45 at the lower end of the pivoted frame 38 and the roller 46 on said frame, so that when the latter is raised as above described, the spindle end of said axle and the wheel thereon will tend to rise, thus causing the forward end of the beams to be lowered and the plow bases to be made to make a deeper furrow. It is apparent that a reverse movement of the hand lever 65 will result in decreasing the depth of plowing. These adjustments of the plow gang are permitted without affecting movement of the follower wheel mounting, by reason of the lost-motion connection between the arm 76 and link 73. Should it be desired however (as in an emergency where the power lift cannot be operated) to fully raise the plow gang, this may be accomplished by moving the lever 65 rearwardly until its detent engages the notch 64ª of segment 64.

When the spindle of the furrow wheel axle is raised by operation of the hand lever 65 as above explained, said axle will turn in its bearings on the beams of the plow gang and the result of this will be to move the arm 78 on said axle, rearwardly. The hand lever 80 mounted on this arm being at this time locked to the segment 79 at the upper end of the arm 78, motion will be imparted, by the rod 81, to the arm 82 depending from the rear or landside wheel axle 14, thus causing said axle to turn and tend to raise the spindle end thereof and the land wheel. In this way, the landside side of the plow gang will be lowered simultaneously with the lowering of the furrow side thereof. It is apparent that when the hand lever is operated to raise the plow gang at the furrow side thereof, the landside side of the gang will be simultaneously raised.

By operating the hand lever 80 on its pivotal connection with the segment arm 78, motion will be imparted, through the rod 81 and arm 82, to the land-wheel axle to turn the latter and thus effect the leveling of the gang.

By providing balancing springs for the two axles, and by so mounting said axles that the cranked portion of the forward axle will project rearwardly and so that the cranked portion of the rear axle will project forwardly, with the spindle portions of the two axles approximately in line with each other, the amount of manual power expended for effecting the various adjustments will be reduced to a minimum and the manipulation of the mechanism thus rendered easy.

It will be observed that when the gang is lowered by manipulation of the lever 65, the plow bases will enter the ground points first and thus the initial opening of the furrows may be greatly facilitated.

Various slight changes might be made in the details of my invention without departing from the spirit thereof and hence I do not wish to restrict myself to the precise details herein set forth.

Having fully described my invention what I claim as new and desire to secure by Letters-Patent, is:—

1. In a gang plow, the combination with a plow gang, furrow and landside wheels, and front and rear axles mounted on the plow gang and having their cranked portions mounted, respectively, in said wheels, of a manually operable lever mounted on the plow gang, connections between said lever and the forward crank axle for turning the latter, an arm secured to said forward axle, a hand lever mounted on said arm, means for locking said hand lever, an arm on the rear axle, and a rod connecting said last-mentioned arm and hand lever.

2. In a gang plow, the combination with a plow gang, furrow and landside wheels, and crank axles mounted on the plow gang and in said wheels, of a notched segment secured to the plow gang, a hand lever mounted on said segment and having a rearwardly projecting arm, a frame pivoted at the forward end of the plow gang, a guide bracket for said pivoted frame secured to the plow gang, connections between the pivoted frame and the forward axle, a connection between the lever arm and said pivoted frame, a segment arm secured to the forward axle, a notched segment carried by said arm, a hand lever pivoted to said segment arm, an arm depending from the rear axle, and a connection between said last-mentioned hand lever and arm.

3. In a gang plow, the combination with a plow gang, furrow and landside wheels, forward and rear crank axles mounted on said plow gang in said wheels, an adjustable supporting wheel at the rear end of the plow gang, and adjusting means for said rear supporting wheel, of a manually operable lever mounted near the forward end of the plow gang, connections between said lever and the forward axle for effecting the raising and lowering of the forward end of the plow gang, lost-motion connections between said forward axle and the adjusting means for the rear supporting wheel, and a balancing spring connected with said rear wheel adjusting means and with the plow gang.

In testimony whereof, I have signed this specification in the presence of two subscribing witnesses.

EDWARD M. HEYLMAN.

Witnesses:
CHAS. A. WEBSTER,
KATE E. BUCKLEY.

Copies of this patent may be obtained for five cents each, by addressing the "Commissioner of Patents, Washington, D. C."